United States Patent
Banach et al.

(10) Patent No.: US 9,995,417 B2
(45) Date of Patent: Jun. 12, 2018

(54) EXTENDED LENGTH TUBE STRUCTURES

(71) Applicants: Lawrence M. Banach, Lockport, NY (US); John M. Bevilacqua, Williamsville, NY (US); Steven W. Lanzone, Cheektowaga, NY (US)

(72) Inventors: Lawrence M. Banach, Lockport, NY (US); John M. Bevilacqua, Williamsville, NY (US); Steven W. Lanzone, Cheektowaga, NY (US)

(73) Assignee: SAINT-GOBAIN CERAMICS & PLASTICS, INC., Worcester, MA (US)

(*) Notice: Subject to any disclaimer, the term of this patent is extended or adjusted under 35 U.S.C. 154(b) by 815 days.

(21) Appl. No.: 13/849,354

(22) Filed: Mar. 22, 2013

(65) Prior Publication Data

US 2013/0285371 A1 Oct. 31, 2013

Related U.S. Application Data

(60) Provisional application No. 61/614,499, filed on Mar. 22, 2012.

(51) Int. Cl.
| | |
|---|---|
| *F16L 13/02* | (2006.01) |
| *C04B 35/565* | (2006.01) |
| *C04B 37/00* | (2006.01) |

(52) U.S. Cl.
CPC ............ *F16L 13/02* (2013.01); *C04B 35/565* (2013.01); *C04B 37/001* (2013.01);
(Continued)

(58) Field of Classification Search
CPC . C04B 37/005; C04B 35/565; C04B 2235/94; C04B 2237/765; C04B 2237/365; C04B 2235/96; C04B 2237/84
See application file for complete search history.

(56) References Cited

U.S. PATENT DOCUMENTS

| | | | |
|---|---|---|---|
| 2,855,355 A | 10/1958 | Ohlinger et al. | |
| 3,457,052 A * | 7/1969 | Carlson | ............ C04B 35/63432 |

(Continued)

FOREIGN PATENT DOCUMENTS

| | | |
|---|---|---|
| CN | 1602252A A | 3/2005 |
| CN | 1827279 A | 9/2006 |

(Continued)

OTHER PUBLICATIONS

Lougher et al. "Design of compression shrink-fit ceramic-steel wear ring assembly for chemical mechanical planarization", 6 pgs, 2000.
(Continued)

*Primary Examiner* — David Bochna
(74) *Attorney, Agent, or Firm* — Abel Law Group, LLP; Thomas Osborn

(57) ABSTRACT

An extended length tube structure includes a first ceramic tube segment having a first end and a second end, and a second ceramic tube segment having a first end and a second end, in which the second end of the first ceramic tube segment is arranged to face the first end of the second ceramic tube segment. A ceramic coupling component is positioned to circumscribe the end-to-end configuration of the tube segments, and is sinter-bonded to the tube segments to form an continuous, extended length tube structure having a seal, such as a sinter bond or an interference bond, that is free of bond materials.

20 Claims, 10 Drawing Sheets

(52) U.S. Cl.
CPC .... *C04B 2235/421* (2013.01); *C04B 2235/48* (2013.01); *C04B 2235/612* (2013.01); *C04B 2235/72* (2013.01); *C04B 2235/721* (2013.01); *C04B 2235/767* (2013.01); *C04B 2235/94* (2013.01); *C04B 2235/96* (2013.01); *C04B 2237/365* (2013.01); *C04B 2237/52* (2013.01); *C04B 2237/765* (2013.01); *C04B 2237/78* (2013.01); *C04B 2237/84* (2013.01)

(56) References Cited

U.S. PATENT DOCUMENTS

| | | | |
|---|---|---|---|
| 3,564,328 A | | 2/1971 | Bagley et al. |
| 3,631,973 A | | 1/1972 | Rode |
| 4,179,299 A | | 12/1979 | Coppola et al. |
| 4,293,325 A | | 10/1981 | Chirino et al. |
| 4,299,638 A | | 11/1981 | Matsuhisa |
| 4,487,664 A | | 12/1984 | Dorbath et al. |
| 4,666,775 A | * | 5/1987 | Kim ................ C04B 35/565 |
| 4,679,960 A | * | 7/1987 | Mizuhara ............ B23B 31/006 |
| 4,780,160 A | * | 10/1988 | Kipp ............... C04B 35/111 |
| 4,783,229 A | | 11/1988 | Mizuhara |
| 4,925,608 A | | 5/1990 | Rossi |
| 5,054,418 A | | 10/1991 | Thompson et al. |
| 5,303,836 A | | 4/1994 | Childress |
| 5,384,173 A | | 1/1995 | Akao et al. |
| 5,611,877 A | | 3/1997 | Yoshida |
| 5,941,302 A | | 8/1999 | Hattori |
| 6,006,824 A | | 12/1999 | Hattori et al. |
| 6,524,421 B1 | * | 2/2003 | Chen ................ B01D 67/0041 |
| 6,648,597 B1 | | 11/2003 | Widrig et al. |
| 8,087,567 B2 | | 1/2012 | Meschke et al. |
| 8,501,082 B2 | | 8/2013 | Hock et al. |
| 8,998,268 B2 | | 4/2015 | Banach et al. |
| 9,290,311 B2 | | 3/2016 | Banach et al. |
| 2004/0154725 A1 | | 8/2004 | Mako |
| 2004/0238982 A1 | * | 12/2004 | Hamaguchi ............ C04B 35/524 |
| 2006/0138962 A1 | * | 6/2006 | Wei ................ H01J 9/266 |
| 2007/0235122 A1 | | 10/2007 | Mesche et al. |
| 2007/0272661 A1 | * | 11/2007 | Whitehead ............ C04B 37/026 |
| 2008/0131665 A1 | | 6/2008 | Suyama et al. |
| 2008/0176056 A1 | | 7/2008 | Kilgus et al. |
| 2009/0239007 A1 | | 9/2009 | Meschke et al. |
| 2010/0038012 A1 | | 2/2010 | Tucker et al. |
| 2010/0062396 A1 | | 3/2010 | Hock et al. |
| 2011/0024431 A1 | | 2/2011 | Yano et al. |
| 2013/0284634 A1 | | 10/2013 | Banach et al. |
| 2013/0285370 A1 | | 10/2013 | Banach et al. |
| 2015/0260322 A1 | * | 9/2015 | Mako, Jr. ................ B32B 18/00 |
| 2016/0152407 A1 | | 6/2016 | Banach et al. |

FOREIGN PATENT DOCUMENTS

| | | | | |
|---|---|---|---|---|
| CN | 101636364 | A | | 1/2010 |
| CN | 202083233 | U | | 12/2011 |
| CN | 104271534 | A | | 1/2015 |
| DE | 3905424 | A1 | * | 8/1990 ........... C04B 37/001 |
| DE | 4410767 | A1 | | 10/1994 |
| EP | 0479657 | A1 | | 4/1992 |
| EP | 1367037 | A2 | | 12/2003 |
| EP | 2828221 | A1 | | 1/2015 |
| FR | 1112734 | A | * | 3/1956 ........... C03C 27/046 |
| GB | 1227695 | A | | 4/1971 |
| GB | 2019891 | A | | 11/1979 |
| GB | 2284375 | A | | 6/1995 |
| GB | 2284376 | A | | 6/1995 |
| JP | 54144411 | A | | 11/1979 |
| JP | S59-190277 | A | | 10/1984 |
| JP | S6146235 | A | | 3/1986 |
| JP | 06298574 | A | | 10/1994 |
| JP | 06298575 | A | | 10/1994 |
| JP | 07270093 | A | | 10/1995 |
| JP | 08187714 | A | | 7/1996 |
| JP | 2006055892 | A | | 3/2006 |
| JP | 2010052966 | A | | 3/2010 |
| JP | 2010285326 | A | | 12/2010 |
| KR | 20070043884 | A | | 4/2007 |
| KR | 20100014337 | A | | 2/2010 |
| WO | 030477859 | A1 | | 6/2003 |
| WO | 2006081957 | A1 | | 8/2006 |
| WO | 2007042808 | A1 | | 4/2007 |
| WO | 2013142828 | A1 | | 9/2013 |

OTHER PUBLICATIONS

International Search Report and Written Opinion dated Jul. 5, 2013, with regard to International application PCT/US2013/033575.
International Search Report and Written Opinion dated Jul. 24, 2013 with regard to international application PCT/USPCT/US13/33574.

* cited by examiner

EXTENDED LENGTH TUBE STRUCTURES

CROSS-REFERENCE TO RELATED APPLICATION

This application claims priority under 35 U.S.C. § 119(e) to U.S. Patent Application No. 61/614,499 entitled "EXTENDED LENGTH TUBE STRUCTURES," by Banach et al., filed Mar. 22, 2012, which is assigned to the current assignee hereof and incorporated herein by reference in its entirety.

FIELD OF THE DISCLOSURE

This disclosure, in general, relates to extended-length tube structures, and more particularly, to ceramic tube structures joined together by sinter bonds.

BRIEF DESCRIPTION OF THE INVENTION

Embodiments of the present invention are generally drawn to extended-length tube structures, formed as ceramic materials, particularly including silicon carbide-based materials. Embodiments of extended length tube structure of the present invention generally include a first tube segment and a second tube segment joined together by a ceramic coupling component. The first tube segment has first and second ends, the second tube segment has first and second ends, and the two segments are arranged in an end-to-end configuration such that the second end of the first ceramic tube segment and the first end of the second tube segment face each other. The ceramic coupling component serves to bond the first and second tube segments together, and is positioned so as to be sinter-bonded to the second end of the first tube segment and to the first end of the second tube segment. In particular, the ceramic coupling component is positioned to circumscribe the end-to-end configuration of the tube segments, and is sinter-bonded to the tube segments to form an continuous, extended length, tube structure having a seal, such as a sinter bond or an interference bond, free of bond materials.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
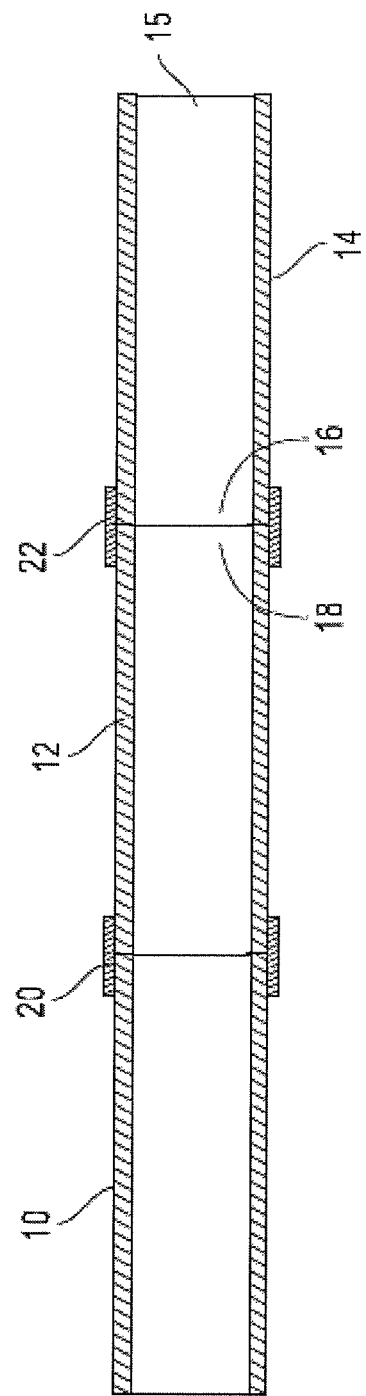
FIG. 1 shows a cross-section of an extended length tube structure according to an embodiment of the present invention, in which tube structures are abutted end-to-end and joined to each other by a ceramic coupling component and a sinter bond therebetween.

Embodiments of the present invention are generally drawn to extended-length tube structures, formed as ceramic materials, particularly including silicon carbide-based materials. Large-sized, such as high thermal mass and/or extended dimension bodies are difficult to manufacture as monolithic ceramic parts. Typically, extended dimensions have notable challenges in terms of sourcing appropriate furnaces, have high thermal budgets, and have extended and slowly-ramping sinter and anneal times. Consequently, certain structures are made in segmented form and joined together.

According to an embodiment of the present invention, extended length tube structure is provided that includes a first tube segment and a second tube segment joined together by a ceramic coupling component. The first tube segment has first and second ends, the second tube segment has first and second ends, and the two segments are arranged in an end-to-end configuration such that the second end of the first ceramic tube segment and the first end of the second tube segment face each other. The ceramic coupling component serves to bond the first and second tube segments together, and is positioned so as to be sinter-bonded to the second end of the first tube segment and to the first end of the second tube segment. The ceramic coupling component may circumscribe the first and second tube segments at a portion on the segments where they meet each other. Notably, the tube segments form a seal with the coupling component, a Shear Strength of the seal being not less about 25 MPa, not less than about 40 MPa, not less than about 50 MPa, not less than about 75 MPa, not less than about 100 MPa, not less than about 100 MPa, not less than about 120 MPa, not less than about 140 MPa, not less than about 170 MPa, or not less than about 200 MPa. In one embodiment, the interface between the tube and the base component exhibits a Shear Strength not greater than about 1000 MPa, such as not greater than about 700 MPa, not greater than about 500 MPa, or not greater than about 300 MPa.

As used herein, reference to Shear Strength as a particular Shear Strength value is measured by testing a sample having standardized dimensions under load. In particular, the Shear Strength is measured by preparing and testing a standardized sample as follows. The sample is prepared from a ceramic tube and a ceramic ring, each having a length of 76.2 mm. The ceramic tube has an outer diameter ($OD_t$) of 14 mm and an inner diameter ($ID_t$) of 11 mm. The ceramic ring has an outer diameter ($OD_r$) of 20 mm, and an inner diameter ($ID_r$) of 14 mm. The ceramic ring is placed around the ceramic tube so that the ends of each are flush, and the tube-ring assembly is then co-sintered. After cooling, a cross-sectional center segment is sliced from the sintered assembly and thickness grinded to a final thickness (t) of 3 mm. The center segment comprises an inner ring sliced from the ceramic tube and an outer ring sliced from the ceramic ring. The area of contact between the inner and outer rings represents the total bond area ($A_b$), and is calculated according to the following formula:

$$A_b = \pi \cdot OD_t \cdot t \quad \text{(Formula I)}$$

The Shear Strength of the center segment sample is tested at room temperature using an Instron 8562 using a 100 kN load cell at a speed of 0.05 mm/min, which applies equal but opposing force to the inner and outer rings, respectively. The magnitude of the applied force is gradually increased until the rings break apart. The force (F) required to break the rings apart is measured in Newtons. The Shear Strength value is obtained according to the following formula:

$$\iota = F \cdot A_b \cdot 10^6 \quad \text{(Formula II)}$$

It should be understood that ceramic articles as described herein can be a wide variety of dimensions and overall sizes, but the Shear Strength values are based on a standardized geometry and testing approach as described above. Consequently, validating the Shear Strength of a sample having differing dimensions larger or smaller than the standardized sample described above requires the fabrication of a standardized sample under identical compositional and processing conditions to that of the sample having differing dimensions.

The ceramic tube segments may be formed by various techniques, such as form molding, slip casting, machining, isopressing, extrusion, and other shape forming techniques. However, embodiments of the present invention are particularly drawn to large-scale tubes, typically having an outside diameter greater than 7-9 inches, and lengths on the order of 0.5 to 3 meters and above. Consequently, extruded tubes tend not to be practical, and various shape forming techniques have their practical limitations. Accordingly, various embodiments are formed by isopressing. Indeed, the extended length tube structures may have an aspect ratio defined as the ratio of length (L) to outer diameter (OD) of not less than 10:1, such as not less than about 20:1, such as not less than about 30:1, or not less than about 40:1. Since there is an ultimate limit on the length of such tubes relative to diameter, most embodiments will not exceed an aspect ratio of 300:1.

According to a particular embodiment, the second end of the first tube segment is in abutting contact with the first end of the second ceramic tube segment. The end faces may have various configurations, including simple, planar structures, but also including complementary structures that "key" together when in abutting contact. One of example of this keyed relationship or interconnected relationship is through use of a shiplapped joint, in which facing surfaces have complementary L-shaped outer contours, as shown in a cross-sectional view, such that they interlock each other. In the case of planar end faces, they may be oriented in a plane perpendicular to the longitudinal access of the tube segments, or alternatively, be oriented off-angle at some acute angle relative to the access smaller than 90°, resembling an offcut tube structure, such as a quill pen or hypodermic needle. In such a case, the tube segments would be oriented such that the off-angle faces are complementary to one another.

As mentioned briefly above, the ceramic tube segments may be formed of a ceramic material, most notably silicon carbide. Additionally, the coupling components may be formed of a ceramic material, notably silicon carbide. The ceramic tube segments and the coupling components may comprise silicon carbide, and in certain embodiments comprise principally silicon carbide, such that silicon carbide is the majority compositional species of the tube, typically greater than at least about 70 wt %, such as greater than at least about 80 wt %, or greater than at least about 90 wt %. In another embodiment, the tube may comprise silicon carbide in an amount greater than at least about 91 wt %, such as greater than at least about 99.85 wt %.

One particular form of silicon carbide is used according to certain embodiments, known as HEXOLOY®-brand silicon carbide (manufactured by Saint-Gobain Advanced Ceramics Corporation of Worcester, Mass., USA), described in U.S. Pat. No. 4,179,299 incorporated herein by reference. Suitable silicon carbides generally contain silicon carbide in an amount greater than at least about 91 wt %, such as greater than at least about 99.85 wt %, up to about 5.0 wt % carbonized organic material, from at least about 0.15 wt % to not greater than about 3.0 wt % boron, and up to about 1.0 wt % additional carbon. The "carbonized organic material" is free carbon or uncombined carbon produced in situ by the carbonization of the organic material used as a raw material in the process of forming the ceramic tube. The carbonizable organic materials that can be used in forming the ceramic tube include but are not limited to phenolic resin, coal tar pitch, polyphenylene, or polymethylphenylene.

Sintered ceramic bodies of silicon carbide according to an embodiment may be characterized by a predominantly equiaxed microstructure, meaning the presence of grains having an aspect ratio of less than 3:1 (i.e., the ratio of the maximum dimension of the grains of the crystal microstructure to the minimum dimension of the grains of the crystal microstructure is less than 3:1). Moreover, the silicon carbide comprises at least about 95 wt %, such as at least about 99 wt % alpha-phase, non-cubic crystalline silicon carbide.

The density of silicon carbide according to an embodiment is at least about 2.40 g/cm$^3$, such as at least about 2.90 g/cm$^3$, or at least about 3.05 g/cm$^3$.

According to certain embodiments, the first and second tube segments, as well as the coupling component are all coaxial. Additionally, the coupling component can take on any one of various outer contours, but it is generally desirable that the coupling component have an inner contour matching the outer contour of the second end of the first tube segment and the first end of the second tube segment. This inner contour of tube segment is generally cylindrical, having a generally circular cross-sectional shape. The outer contour can vary, but for ease of fabrication and for predictable shrinkage rates, the outer contour of the coupling may also be cylindrical. According to one particular feature of an embodiment, an inner face between the coupling component and each of the tubes segments to which it is bonded forms a seal, that seals characterized by Shear Strength of the seal being not less about 25 MPa, not less than about 40 MPa, not less than about 50 MPa, not less than about 75 MPa, not less than about 100 MPa, not less than about 100 MPa, not less than about 120 MPa, not less than about 140 MPa, not less than about 170 MPa, or not less than about 200 MPa. In one embodiment, the interface between the tube and the base component exhibits a Shear Strength not greater than about 1000 MPa, such as not greater than about 700 MPa, not greater than about 500 MPa, or not greater than about 300 MPa.

A Nitrogen Seal Performance is determined according to a nitrogen seal performance test, wherein nitrogen is applied at an interface of a seal at a given initial positive pressure, and pressure loss is measured by a pressure gauge. Nitrogen Seal Performance is then the percent pressure drop occurring across the seal interface over a period of 2 hours at an applied gauge pressure of 200 psi. Embodiments herein achieve a Nitrogen seal performance of not greater than 10%, not greater than 9%, not greater than 8%, not greater than 7%, not greater than 6%, not greater than 5%, not greater than 4%, not greater than 3%, not greater than 2%, not greater than 1.9%, not greater than 1.8%, not greater than 1.7%, not greater than 1.6%, not greater than 1.5%, not greater than 1.4%, not greater than 1.3%, not greater than 1.2%, not greater than 1.1%, not greater than 1.0%, not greater than 0.9%, not greater than 0.8%, not greater than 0.7%, not greater than 0.6%, not greater than 0.5%, not greater than 0.4%, not greater than 0.3%, not greater than 0.2%, or not greater than 0.1% of an initial pressure differential of 200 PSI (gauge pressure).

A Helium Seal Performance is determined according to a helium seal performance test, wherein helium is applied at an interface of a seal at a given initial positive pressure and pressure loss is measured by a pressure gauge. Helium Seal Performance is achieved if the pressure drop occurring across the seal interface over a period of 2 hours is not greater than 10%, not greater than 9%, not greater than 8%, not greater than 7%, not greater than 6%, not greater than 5%, not greater than 4%, not greater than 3%, not greater than 2%, not greater than 1.9%, not greater than 1.8%, not greater than 1.7%, not greater than 1.6%, not greater than 1.5%, not greater than 1.4%, not greater than 1.3%, not greater than 1.2%, not greater than 1.1%, not greater than 1.0%, not greater than 0.9%, not greater than 0.8%, not greater than 0.7%, not greater than 0.6%, not greater than 0.5%, not greater than 0.4%, not greater than 0.3%, not greater than 0.2%, or not greater than 0.1% of an initial pressure differential of 87 PSI (gauge pressure)), an initial pressure differential of about 200 psi (about 13.8 bar), or an initial pressure differential of about 6 barg (bar gauge).

A Vacuum Seal Performance is determined according to a vacuum seal performance test. In the vacuum seal performance test, a vacuum is applied to a seal. The nitrogen gas atmosphere inside the tube is then lowered from 1 ATM (760 torr) to a pressure of 10 torr thereby having a pressure differential of 750 torr. Vacuum Seal Performance is achieved if the gain inside the tube occurring across the seal interface over a period of 2 hours is not greater than 10%, not greater than 9%, not greater than 8%, not greater than 7%, not greater than 6%, not greater than 5%, not greater than 4%, not greater than 3%, not greater than 2%, not greater than 1.9%, not greater than 1.8%, not greater than 1.7%, not greater than 1.6%, not greater than 1.5%, not greater than 1.4%, not greater than 1.3%, not greater than 1.2%, not greater than 1.1%, not greater than 1.0%, not greater than 0.9%, not greater than 0.8%, not greater than 0.7%, not greater than 0.6%, not greater than 0.5%, not greater than 0.4%, not greater than 0.3%, not greater than 0.2%, or not greater than 0.1% of the pressure differential (750 torr).

In each of the seal performance tests, the bond or interface is subjected to the above-described pressure differential. Depending on the geometry of the part, an inner volume is pressurized or evacuated, and holes plugged. In a case of an external seal, such as in the case of a flange on a tube, an end-cap is positioned to cover the flange and exposed bore of the tube, the cap being offset from the bore to allow fluid communication (and hence pressure/vacuum) extending radially up to the bond region. Caps/plugs can have varying geometries to fit the part undergoing test, and can be sealed with a vacuum grease to ensure a pressure tight, hermetic seal.

Sintered ceramic articles as described herein can be formed through a multi-step sintering approach. For example, a green ceramic tube is formed through any one of suitable shape forming technologies, such as molding, slip casting, isopressing, machining, and particularly extrusion. As is generally understood in the art, the green ceramic tube generally contains a water or organic liquid phase combined with various processing aids and binders. For additional information on compositional details, reference can be made to U.S. Pat. No. 4,179,299 incorporated herein by reference.

Extended length tube structures according to embodiments here and may be formed by various techniques. According to one, the first and second tube segments are provided, each having first and second ends. Each of the first and second tube segments are pre-sintered, at a temperature above 2000° C., such as above 2050° C., but generally below 2400° C., such as below 2300° C., such as below 2250° C. A suitable target range for sintering the green ceramic tube in the case of silicon carbide can lie within a range of 2100-2200° C. Sintering times can vary, and are largely dependent on the thermal mass of the tube. However, typically sintering times range from 15 minutes to 10 hours, such as not less than about 30 minutes, such as not less than about 1 hour, such as not less than about 1.5 hours. While large, high mass tubes may require extended sintering times, typically sintering times do not exceed 30 hours, such as not great than 20 hours, such as not greater than 10 hours.

After the sintering step is completed, at least a portion of an outer surface of the sintered tube is subjected to surface cleaning. Typically, at least the portion of the tube that will contact the base component will be subjected to surface cleaning. In this respect, it has been found that the outer surface of the tube can carry contaminates, such as contaminates that are deposited during the sintering process, or which form as a consequence of the sintering process and changes in the crystallographic and compositional structure of the tube. For example, binders within the composition may burn-out, leaving behind a carbonaceous reside on the outer surface of the tube. That carbonaceous residue, generally in the form of free carbon, can negatively impact the quality of bond between the tube and the base component, inhibiting a hermetic seal.

Processing to form an extended length ceramic tube structure continues with provision of an un-sintered or partially sintered ceramic coupling component. That ceramic coupling component is arranged so as to overlie or circumscribe the first and second tube segments, particularly at the second end of the first tube segment and the first end of the second tube segment, and more particularly at the portions on the first and second tube segments where they first and second tube segments meet each other. Subsequently, the arrangement of the first and second tube segments and the positioned coupling component is then subjected to a sintering step during which the coupling component shrinks to its final dimensions.

Further, before the pre-sintering step, each of the ceramic tube segments may be subjected to a machining operation. Stated alternatively, this machining step is carried out in the green state, where the tube is in a state that allows easier material removal than in the sintered state. The machining may be effective to reduce or even completely remove dimensional or surface irregularities of the green tube. For example, in the case of extrusion, the green tube may have characteristic score lines extending partially or wholly along the entire length of the tube. Those score lines can inhibit the formation of a strong interfacial sinter bond, as well as a hermetic seal. In the case of other formation technologies, machining may still be desirable. For example, in the case of isopressing or molding, characteristic imperfections may be left behind on the green tube, such as flashing.

Sintered ceramic bodies of silicon carbide according to an embodiment may be characterized by the amount the bodies shrink from a green state to a fully sintered state. For example, green ceramic bodies of silicon carbide according to an embodiment may shrink more than about 10% from their original size, more than about 12%, more than about 15%, more than about 17%, less than about 25%, less than about 20%, less than about 17%, less than about 15% upon being fully sintered. In a particular embodiment, a green ceramic body of silicon carbide may shrink approximately 17% from its original size upon being fully sintered. When combining a pre-sintered first component, such as a tube, with a green second component, such as an un-sintered or incompletely sintered coupling component that circumvents the pre-sintered first component, the shrinkage relationship, and the amount of interference bond, can be expressed as follows.

$$ID_{c,FS} = OD_t - \Delta, \text{ where}$$

$ID_{c,FS}$ is the inside diameter (ID) of a fully sintered coupling component, $OD_t$ is the outside diameter (OD) of the pre-sintered tube, and $\Delta$ is the interference (coupling component undersizement). For example, a pre-sintered tube has a bond surface, or outside diameter, of 2.0″ (i.e. $OD_t=2.0$). An interference bond of 5% (i.e. $\Delta=5\%$) of a second body, such as the coupling component, requires a fully sintered coupling component ID ($ID_{c,FS}$) to be 0.10″ less than the $OD_t$ (i.e. 2.0*5%=0.10), or 1.90″ (i.e. $ID_{c,FS} = OD_t - \Delta$, or 1.90″=2.0″−0.10″). Thus, to attain a 5% interference of a fully sintered coupling component on the pre-sintered tube, the green coupling component will be made to have a theoretically fully sintered inner diameter (if it were sintered by itself) of 1.90″.

Further, the ID of the green second component (i.e. the un-sintered coupling component) can be expressed as follows.

$$ID_{c,FS}/(1-R_s) = ID_c, \text{ where}$$

$ID_c$ is the inner diameter of the green second component, or un-sintered coupling component, and $R_s$ is the shrinkage rate of the second component (expressed as a decimal). Thus, in accordance with the example given above, and assuming the shrinkage rate of the second component is 17.0%, the inner diameter of the green coupling component ($ID_c$) can be calculated as 1.9÷(1−0.170)=2.289″.

Figure 2:
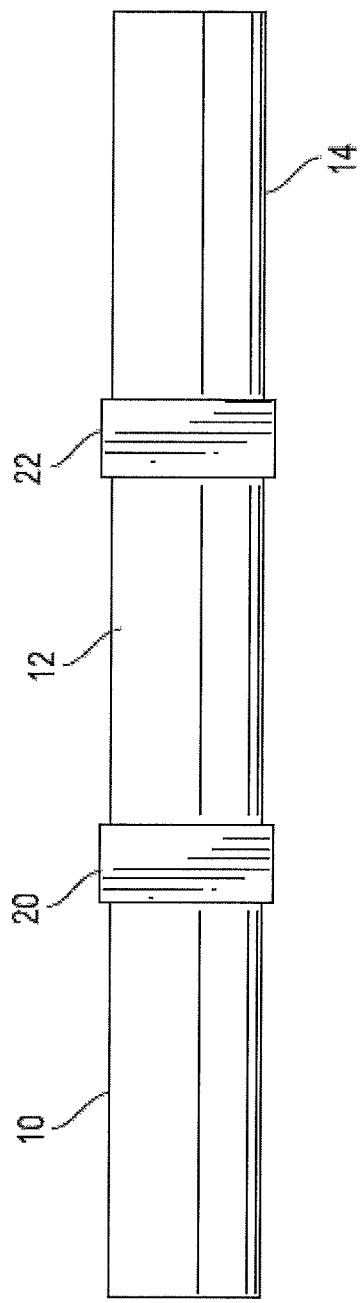
FIG. 2 shows a plan view of the extended length tube structure embodiment shown in FIG. 1.

Turning to specific embodiments, a first embodiment of an extended length tube structure is shown in FIGS. 1 and 2. FIG. 1 is a cross-section of an extended length tube segment containing 3 segments, and FIG. 2 shows that same structure but in plan view. The extended length tube segment includes a first tube segment 14, a second tube segment 12, and a third tube segment 10, each being arranged in end-end relationship. As particularly shown in FIG. 1, the first tube segment 14 includes a first end 15 and a second end 16. The second tube segment 12 includes a first end 18. Further, the first and second coupling components 22, 20, respectively are shown, and are disposed about the interfaces between the second end 16 of the first component 14 and the first end 18 of the second component 12.

Figure 3:
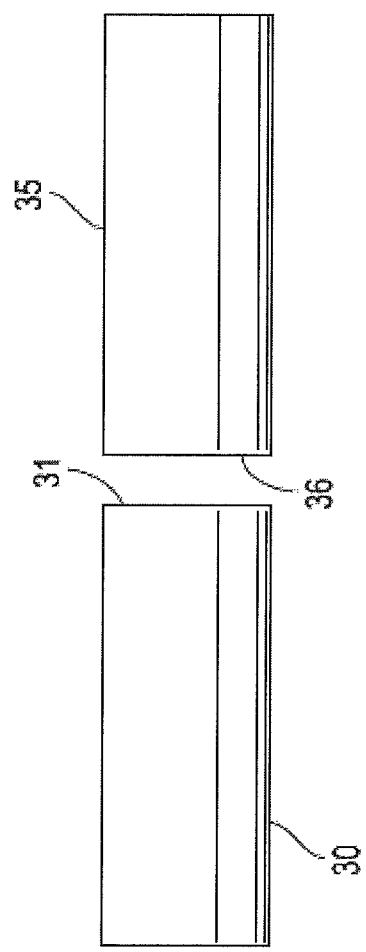
FIG. 3 shows an exploded plan view of the end faces of adjacent tube segments to be abutted together according to an embodiment of the present invention.
Figure 4:
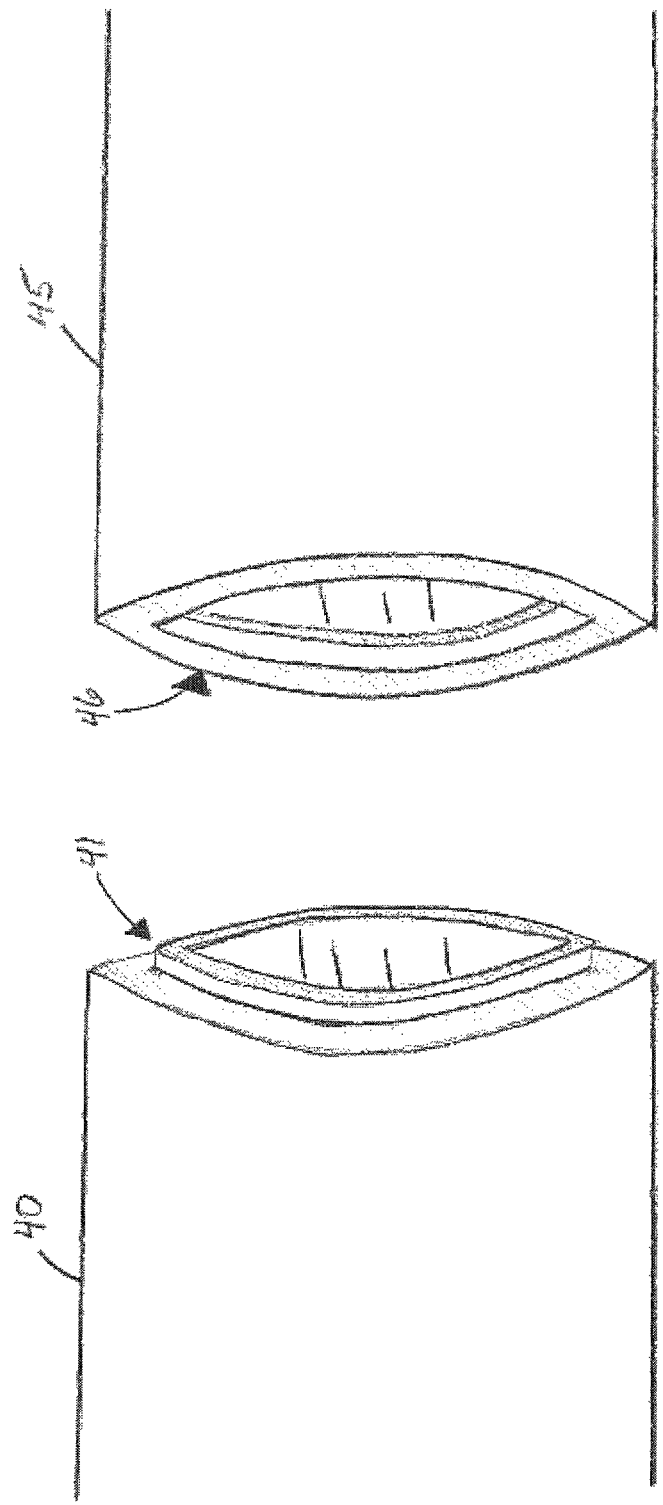
FIG. 4 shows an exploded cross-section view of the end faces of adjacent tube segments of another embodiment, in which the adjacent tube segments have complementary L-shaped end faces.

FIGS. 3 and 4 show different geometric configurations for the end faces of adjacent tube segments. FIG. 3 illustrates a simplified structure having a first tube segment 30, a second tube segment 35, the first tube segment 30 having a planar end face 31, the second tube segment 35 having a planar end face 36.

FIG. 4 illustrates what can be referred to as a "shiplapped" engagement structure between adjacent tube segments, including a first tube segment 40 having an L-shaped end face 41, and a second tube-segment 45 having an L-shaped end face 46. As shown, the L-shaped structures are inverted with respect to each other so as to be complementary in nature, and achieve a "keyed" configuration.

Figure 5:
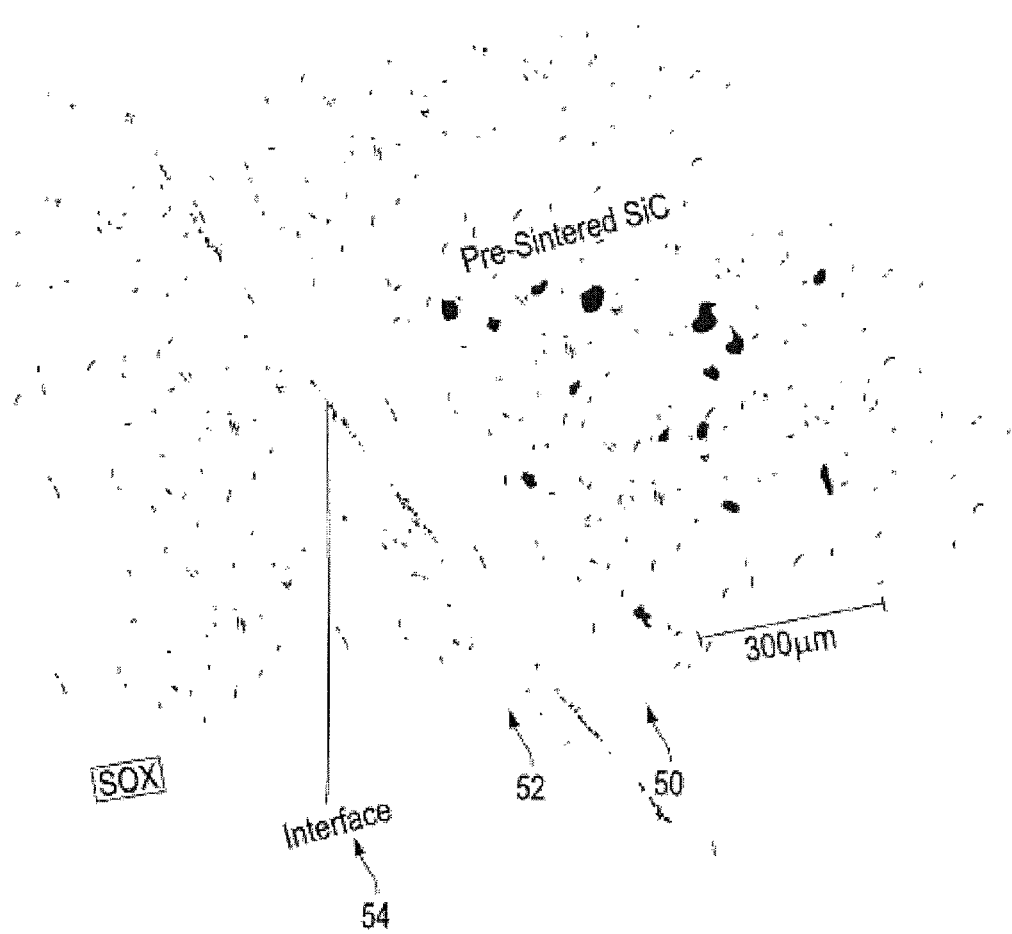
FIG. 5 shows the sinter-bond interface between a pre-sintered silicon carbide segment and a ceramic coupling component.
Figure 6:
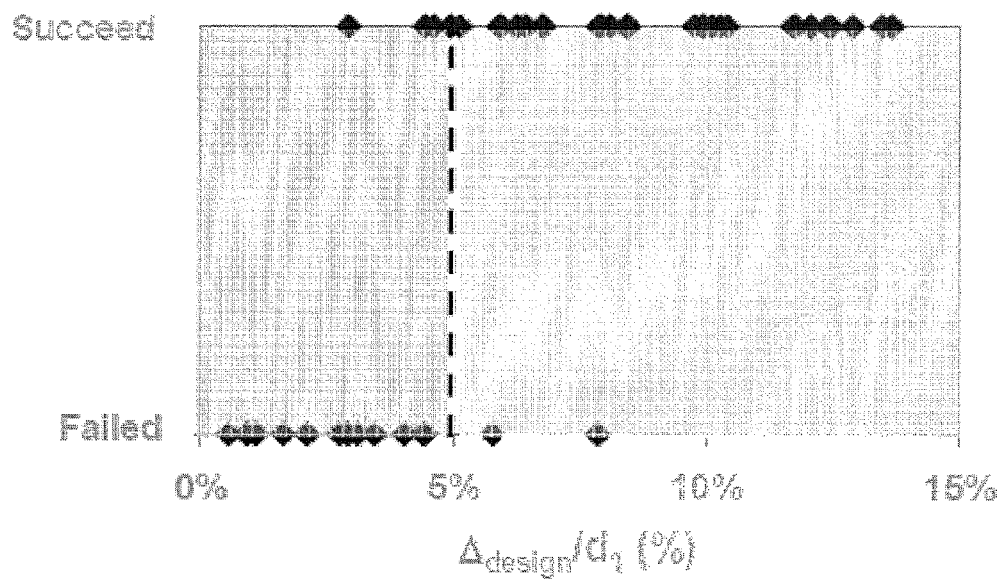
FIG. 6 shows a graph of a pressure test of one embodiment of a ceramic article at 200 psi.
Figure 7:
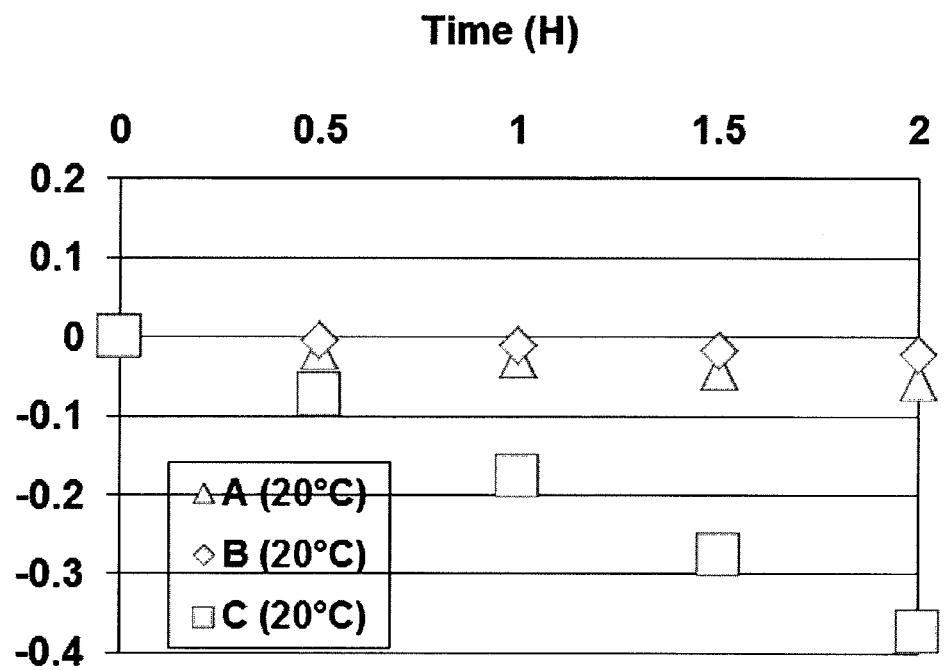
FIG. 7 shows a graph of a pressure test at 20° C. of three embodiments of a ceramic article.
Figure 8:
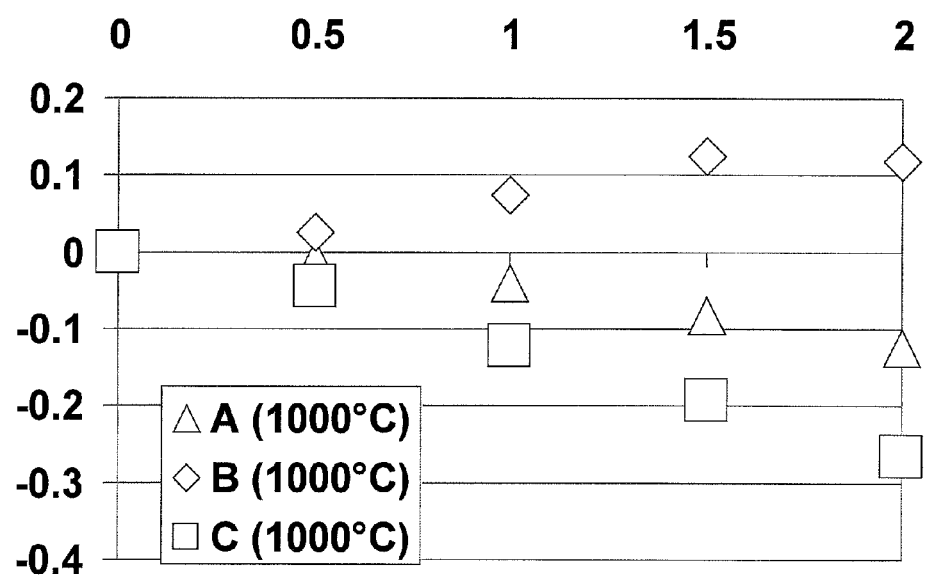
FIG. 8 shows a graph of a pressure test at 1000° C. of the three embodiments of FIG. 7.

FIG. 5 is an SEM cross-section showing the interfacial bond between a pre-sintered silicon carbide tube 50, and a base component, such as a coupling component, 52. Between the components 50 and 52 is an interface 54, which provides a hermetic seal between components 50 and 52. The interface 54 may also be defined as a sinter bond (e.g. sintered bond) or an interference bond or fit. While the interface may be easily seen in the figure, it should be noted that portions of the interface are obscured by a non-colored or white depiction. These areas indicate areas where grain growth occurred across the interface (i.e. crystallographic grains extend across and bridge, functioning to strengthen and enhance the hermetic seal across the interface. Stated alternatively, grains, formed of crystals from each of the two components joined and grew or extended so as to bridge the interface creating a strong chemical or crystallographic bond across the interface. Consequently, the bond is more complex than a typical friction-fit direct bond structure, but includes both mechanical and crystallographic components to improve the robustness of the interface.

The following examples include helium pressure testing on embodiments of articles having silicon carbide components including a sinter bond, or interference bond, according to the embodiments discussed above. The embodiments tested generally included a pre-sintered tube with a flange, cap, or other component sintered to the pre-sintered tube. Although the articles and components tested may vary in some respects to those disclosed herein, the tested seals (e.g. interference bonds, sintered-bonds) in the following examples are similar or identical to the embodiments of the seals described and disclosed herein, and thus the results are relevant to the performance of the disclosed embodiments.

Example 1

Several ceramic articles were formed to include an interference bond between a ceramic tube and ceramic flange as follows. A 14 mm OD ceramic tube was prepared according to the methods discussed above. One end of the tube was capped, and the tube and cap was pre-sintered according to the methods discussed above in order to provide a pre-sintered tube with a closed end and an open end. Several green ceramic flanges were prepared according to the methods above to fit over the open end of the pre-sintered tube. The green ceramic flanges were engineered to provide a fully-sintered ID that was less than the OD of the 14 mm tube (e.g. interference) by about 0% to about 15%. The green ceramic flanges were provided on the open end of the pre-sintered tube and was co-sintered with the pre-sintered tube to provide an interference bond according to the methods discussed above.

Figure 9:
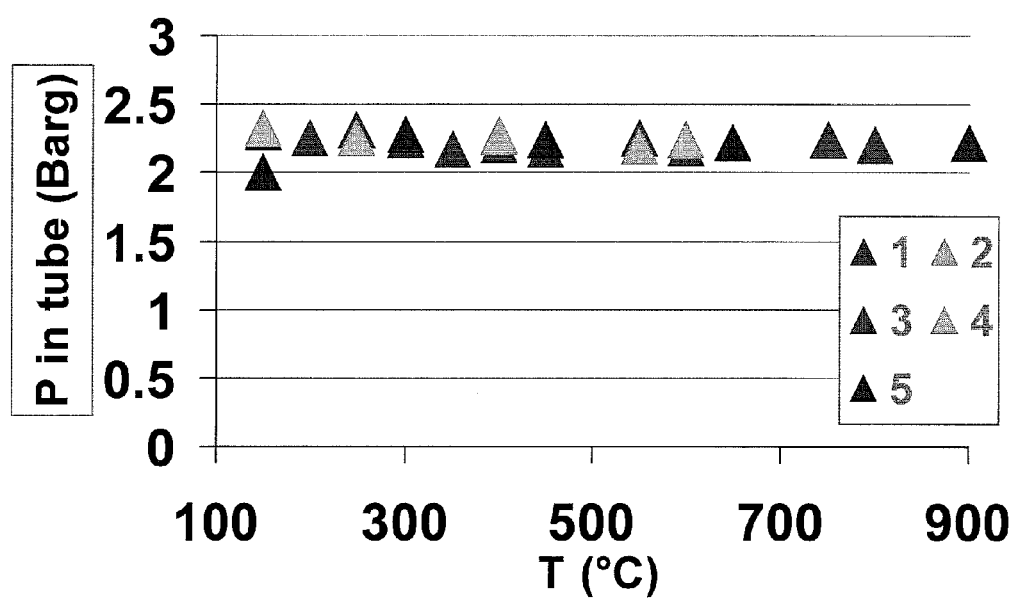
FIG. 9 shows a graph of pressure vs. temperature of a pressure test of an embodiment of a ceramic article through five (5) thermal cycles.

After the ceramic articles were formed, they were pressure tested by providing 200 psi (about 13.8 bar) of helium (He) on one side of the interference bond to determine the integrity of the interference bond of each ceramic article. FIG. 9 shows that the majority of the samples of ceramic articles having a flange engineered to have between about 0% to about 5% fully-sintered ID failed in holding pressure. FIG. 9 also shows that a majority of the sample of ceramic articles having a flange engineered to have between about 5% to about 15% fully-sintered ID succeeded in holding pressure. In particular, FIG. 9 tends to show that a threshold value of about 5% is successful in holding pressure.

Example 2

A ceramic article having a 100 mm OD tube was prepared and pre-sintered according to the methods discussed above, and was fitted with a green flange engineered to have a fully-sintered ID of 3% less than the pre-sintered tube. The tube and flange were co-sintered to form a ceramic article having an interference bond according to the methods discussed above, and pressure tested at 20° C. with 6 barg (bar gauge) of helium on one side of the interference bond to determine the integrity of the interference bond of the ceramic article. The ceramic article lost about 0.2 bar over a 12 hour period.

Example 3

Three ceramic articles having a 35 mm OD tube were prepared and pre-sintered according to the methods discussed above, and each was fitted with a green flange and subsequently co-sintered to form a ceramic article having an interference bond according to the methods discussed above. A first ceramic article included a flange engineered to have a fully-sintered ID of 3% less than the pre-sintered tube, a second ceramic article included a flange engineered to have a fully-sintered ID of 5% less than the pre-sintered tube, and a third ceramic article included a flange engineered to have a fully-sintered ID of 11% less than the pre-sintered tube. The three ceramic articles were subjected to five (5) thermal cycles from 20° C. to 1000° C., and pressurized with 6 barg of helium on one side of the interference bond to determine the integrity of the interference bond of each ceramic article. Pressure readings were taken at 20° C. and 1000° C. for each ceramic article at each iteration of thermal cycling. The results of the 20° C. readings are shown in FIG. 10, and the results for the 1000° C. are shown in FIG. 11, where sample "A" is the 3% sample and depicted as a triangle, sample "B" is the 5% sample and depicted as a diamond, and sample "C" is the 11% sample and depicted as a square.

Figure 10:
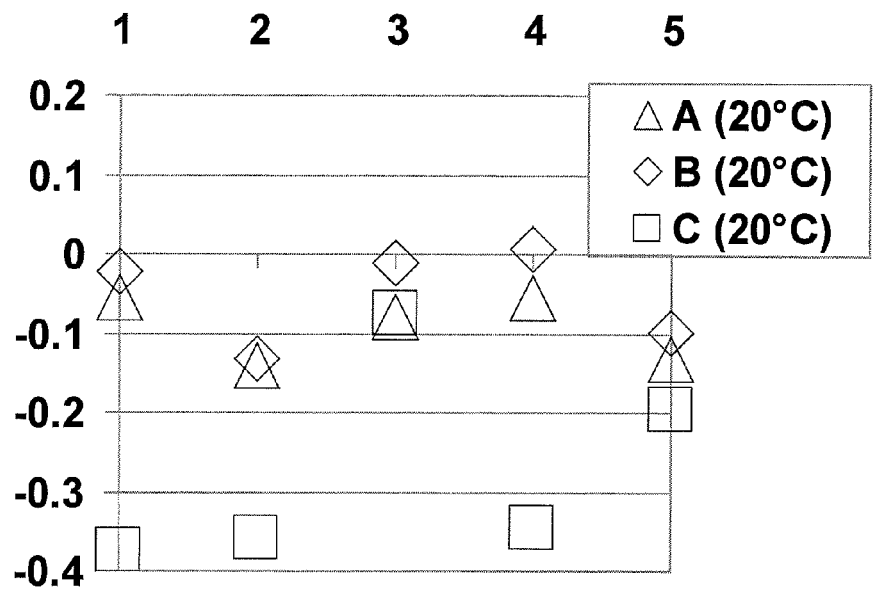
FIG. 10 shows a graph of a pressure test at 20° C. of three embodiments of a ceramic article.

As shown in FIG. 10, samples A and B lost less than 0.1 (−0.1) bar/H at 20° C. The average pressure loss for sample A at 20° C. is less than about 0.03 bar/H, and the average pressure loss for sample B at 20° C. is less than about 0.01 bar/H. FIG. 10 also shows that sample C increasingly lost pressure at each thermal cycle reading taken at 20° C. It is unclear why sample C readings show a continuous loss in pressure as this is contrary to the expectations of that sample.

Figure 11:
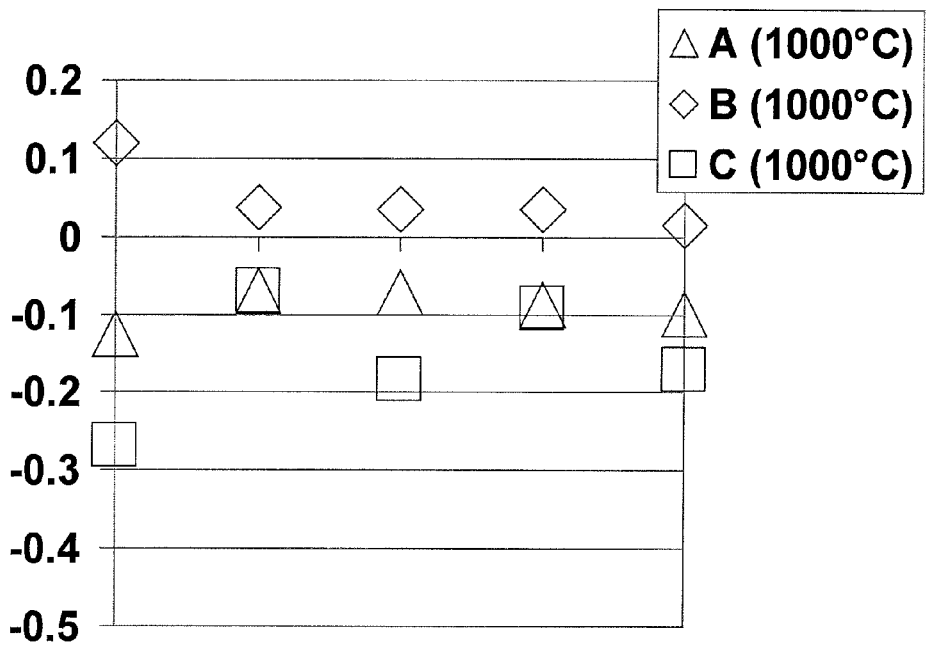
FIG. 11 shows a graph of a pressure test at 1000° C. of the three embodiments of FIG. 10.

Turning to FIG. 11, sample A (the 3% sample) actually shows an increase in pressure at each thermal cycle reading taken at 1000° C. It is unclear why pressure increased in sample A at 1000° C. The average pressure gain of sample A taken at 1000° C. is about 0.06 bar/H. In FIG. 11, sample B (the 5% sample) shows less than 0.2 (−0.2) bar/H pressure loss. The average pressure loss for sample B taken at 1000° C. is less than about 0.03 bar/H. FIG. 11 also shows that sample C (the 11% sample) has a continuous increase in pressure loss at each thermal cycle, which is consistent with the data of FIG. 10. The results of the thermal cycle pressure readings of FIGS. 10 and 11 tend to show that sample B (the 5% sample) provides a tighter interference bond than either sample A or C.

Example 4

Figure 12:
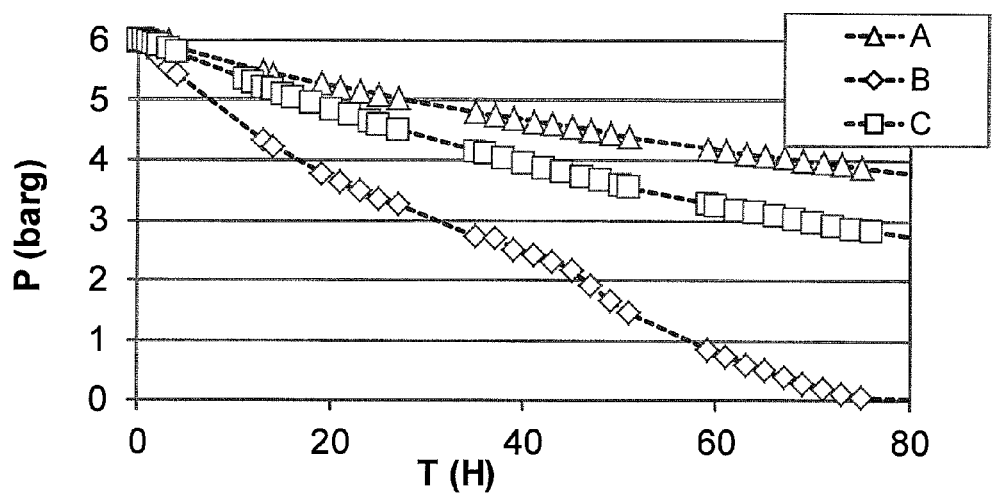
FIG. 12 shows a graph of pressure vs. temperature of a long duration test of three embodiments of a ceramic article.

A ceramic article was prepared according to sample B (the 5% sample) in Example 3 above, and was tested for pressure loss at intermediate temperatures by pressurizing one side of the interference bond of the ceramic article with 2 barg of helium while heating the ceramic article up to 1000° C. As FIG. 12 shows, frequent measurements were taken at several temperatures between the thermal cycle of about 100° C. to about 900° C. As FIG. 12 also indicates, the pressure in the tube (measured in barg) remained between about 2 barg and 2.5 barg through the thermal cycle. The results of this example indicate little to no loss or degradation of tightness in the interference bond throughout a thermal cycle, also suggesting that the secondary component (cap, flange, etc.) bonds well to the tube because both components have identical, or nearly identical, coefficients of thermal expansion (CTE). It is also noted that, although not shown in the FIGS., several samples have been known to operate at greater than about 1000° C., greater than about 1300° C., and even greater than 2000° C. with no appreciable increase in pressure loss when subsequently tested at temperatures at or below 1000° C.

Example 5

Three ceramic articles (samples A, B, and C) were prepared according to example 3 above, and subjected to five (5) testing iterations of thermal cycles between 20° C. and 100° C. while provided with 6 barg of helium on one side of the interference bond of each sample. The results are shown in FIGS. 13 and 14. As shown in FIG. 13, sample A (3% sample) had an average pressure loss at 20° C. of about 0.05 bar/H, sample B (5% sample) had an average pressure loss at 20° C. of about 0.03 bar/h, and sample C (11% sample) had an average pressure loss of about 0.13 bar/H. FIG. 14 shows that sample B tends to provide a pressure increase at 1000° C. It is unclear why sample B increases pressure in the tube at 1000° C. However, FIGS. 13 and 14 appear to indicate that sample B provides the tightest interference bond and, thus, provides higher fidelity in pressure retention at thermal cycling than the other samples.

Example 6

Three ceramic articles (samples A, B, and C) were prepared according to example 3 above, and subjected to a long duration (about 72-80 hours) pressure test at 1000° C. with 6 barg of helium on one side of the interference bond of each sample. The results of the long duration pressure test are shown in FIG. 15. As shown in FIG. 15, sample B (5% sample) lost all pressure at the end of the long duration test, at approximately 72 hours. The results are anomalous, and it is believed that a hermetic seal was not fully achieved with sample B.

What is claimed is:
1. An extended length tube structure comprising:
   a first ceramic tube segment having a first end and a second end, and a second ceramic tube segment having a first end and a second end, the second end of the first ceramic tube segment being arranged to face and in abutting contact with the first end of the second ceramic tube segment, each of the first and second ceramic tube segments having an inner diameter and an outer diameter;

a ceramic coupling component sinter bonded to the second end of the first tube segment and the first end of the second tube segment such that the first and second tube segments are arranged end to end to form a continuous tube structure, wherein each of the ceramic tube segments forms a direct sinter-bond seal with the ceramic coupling component, wherein the direct sinter-bond seal is free of an intermediate bond material between the first and second ceramic tube segments and the ceramic coupling component and has at least one performance characteristic selected from the group consisting of:
  i) a Shear Strength not less than about 25 MPa;
  ii) a Nitrogen Seal Performance of not greater than 10%;
  iii) a Helium Seal Performance of not greater than 10%; and
  iv) a Vacuum Seal Performance of not greater than 10%.

2. The extended length tube structure of claim 1, wherein at least one of the ceramic tube segments comprises an isopressed tube segment.

3. The extended length tube structure of claim 1, wherein the first ceramic tube segment, the second ceramic tube segment, the coupling component, or any combination thereof comprises silicon carbide.

4. The extended length tube structure of claim 1, wherein the second end of the first tube segment has an end face and the first end of the second ceramic tube structure has an end face, and wherein the end faces have complementary structures.

5. The extended length tube structure of claim 4, wherein the end faces are planar.

6. The extended length tube structure of claim 4, wherein the end faces lie in a plane perpendicular to a longitudinal axis of the first or second ceramic tube segment.

7. The extended length tube structure of claim 4, wherein the end faces are non-planar.

8. The extended length tube structure of claim 7, wherein the end face of the first tube segment has an L-shaped contour, the end face of the second tube segment has an L-shaped contour, and wherein the L-shaped contours of the first and second tube segments are complementary to each other.

9. The extended length tube structure of claim 1, wherein the extended length tube structure has an outer diameter (OD) and a length (L), and an aspect ratio of L:OD of not less than about 10:1 and not greater than 300:1.

10. The extended length tube structure of claim 1, wherein the first tube segment, the second tube segment, and the coupling component are coaxial.

11. The extended length tube structure of claim 1, wherein the coupling component comprises a cylindrical body.

12. The extended length tube structure of claim 1, wherein crystallographic grains from each of the first tube segment and the coupling component extend across and bridge a sinter bond interface between the first tube segment and the coupling component, and wherein crystallographic grains from each of the second tube segment and the coupling component extend across and bridge a sinter bond interface between the first tube segment and the coupling component.

13. The extended length tube structure of claim 1, wherein at least one of the seals has a Shear Strength of not less than about 40 MPa.

14. The extended length tube structure of claim 1, wherein the seal is a hermetic seal.

15. The extended length tube structure of claim 1, wherein the seal has a Seal Performance of not greater than about 9%, wherein the Seal Performance is a Nitrogen Seal Performance, a Helium Seal Performance, or a Vacuum Seal Performance.

16. An extended length tube structure comprising:
a first ceramic tube segment having a first end and a second end, and a second ceramic tube segment having a first end and a second end, the second end of the first ceramic tube segment being arranged to face the first end of the second ceramic tube segment, each of the first and second ceramic tube segments having an inner diameter and an outer diameter;

a ceramic coupling component sinter bonded to the second end of the first tube segment and the first end of the second tube segment such that the first and second tube segments are arranged end to end to form a continuous tube structure, wherein each of the ceramic tube segments forms a direct sinter-bond seal with the ceramic coupling component, wherein the direct sinter-bond seal is free of an intermediate bond material between the first and second ceramic tube segments and the ceramic coupling component and has at least one performance characteristic selected from the group consisting of:
  i) a Shear Strength not less than about 25 MPa;
  ii) a Nitrogen Seal Performance of not greater than 10%;
  iii) a Helium Seal Performance of not greater than 10%; and
  iv) a Vacuum Seal Performance of not greater than 10%,
wherein the first ceramic tube segment, the second ceramic tube segment, the coupling component, or any combination thereof comprises silicon carbide.

17. The extended length tube structure of claim 16, wherein each of the first ceramic tube segment, the second ceramic tube segment, the coupling component comprise silicon carbide.

18. The extended length tube structure of claim 17, wherein the silicon carbide comprises a content of the silicon carbide from at least about 91 wt % to no greater than about 99.85 wt %, wherein at least about 95 wt % of the silicon carbide is alpha phase.

19. The extended length tube structure of claim 18, wherein the silicon carbide further comprises:
a carbonized organic material in an amount no greater than about 5.0 wt %;
boron in an amount from at least about 0.15 wt % to no greater than about 3.0 wt %;
additional carbon in an amount no greater than about 1.0 wt %; and
a predominantly equiaxed microstructure.

20. A method of forming an extended length ceramic tube structure, comprising:
providing a first ceramic tube segment having a first end and a second end;
providing a second ceramic tube segment having a first end and a second end;
pre-sintering the first and second ceramic tube segments;
surface cleaning an outer surface of each of the tube segments;
providing an un-sintered or partially sintered ceramic coupling component;

arranging the first and second tube segments and the coupling component such that the second end of the first ceramic tube segment faces the first end of the second ceramic tube segment, and the coupling component overlies the second end of the first tube segment and the first end of the second tube segment; and co-sintering the first and second tube segments and the coupling component to form a direct sinter-bond seal between the coupling component and each of the first and second tube segments, wherein the direct sinter-bond seal is free of an intermediate bond material between the first and second ceramic tube segments and the ceramic coupling component and has at least one performance characteristic selected from the group consisting of:
  i) a Shear Strength not less than about 25 MPa;
  ii) a Nitrogen Seal Performance of not greater than 10%;
  iii) a Helium Seal Performance of not greater than 10%; and
  iv) a Vacuum Seal Performance of not greater than 10%,
wherein the first ceramic tube segment, the second ceramic tube segment, the coupling component, or any combination thereof comprises silicon carbide.

* * * * *